United States Patent [19]
Shioyama et al.

[11] 4,391,247
[45] Jul. 5, 1983

[54] AIR FLOW DETECTION ARRANGEMENT

[75] Inventors: Giichi Shioyama, Yokosuka; Yoshitaka Hata, Fujisawa; Masao Nakajima, Atsugi, all of Japan

[73] Assignee: Nissan Motor Company, Limited, Yokohama, Japan

[21] Appl. No.: 196,524

[22] Filed: Oct. 14, 1980

[30] Foreign Application Priority Data

Oct. 15, 1979 [JP] Japan .................... 54-132624

[51] Int. Cl.³ .................................. F02D 9/08
[52] U.S. Cl. .............................. 123/403; 261/65
[58] Field of Search ............ 123/336, 337, 403, 391, 123/401, 47 E; 261/65

[56] References Cited

U.S. PATENT DOCUMENTS

| | | | |
|---|---|---|---|
| 2,017,914 | 10/1935 | Messinger, Jr. | 123/337 |
| 2,089,771 | 8/1937 | Swinney | 123/579 |
| 2,145,086 | 1/1939 | Hoof | 137/152 |
| 3,903,215 | 9/1975 | Cole et al. | 261/65 X |
| 4,155,332 | 5/1979 | Yaegashi et al. | 123/478 X |

FOREIGN PATENT DOCUMENTS

| | | |
|---|---|---|
| 697779 | 10/1940 | Fed. Rep. of Germany . |
| 2340834 | 7/1974 | Fed. Rep. of Germany . |
| 2742797 | 4/1979 | Fed. Rep. of Germany . |
| 30127 | 12/1903 | Switzerland . |
| 1027696 | 4/1966 | United Kingdom . |
| 1315955 | 5/1973 | United Kingdom . |
| 1375300 | 11/1974 | United Kingdom . |

*Primary Examiner*—William A. Cuchlinski, Jr.
*Attorney, Agent, or Firm*—Schwartz, Jeffery, Schwaab, Mack, Blumenthal & Koch

[57] ABSTRACT

A throttle valve has or cooperates with a metering wall or walls which function to limit the amount of air permitted to flow past the edge of the throttle valve when it is initially moved from its closed position. The amount of rotation of the throttle valve for a given change of air flow is thus increased enabling the output of a sensor such as a variable resistor to vary sufficiently to enable an accurate indication of the amount of air passing to the engine especially at frequently used relatively low throttle settings.

9 Claims, 11 Drawing Figures

AIR FLOW DETECTION ARRANGEMENT

BACKGROUND OF THE INVENTION

1. Field of the Invention

The present invention relates generally to a throttle valve for an internal combustion engine and more particularly to a throttle valve arrangement which is provided with or cooperates with a metering wall or walls for restricting the flow of air therepast whereby a violent change in air flow normally experienced at the initial opening of the throttle valve is eliminated and an accurate estimation of the amount of air flowing to the cylinder or cylinders of the engine especially at low throttle opening degrees is made possible using only the throttle valve angle.

2. Description of the Prior Art

There are two basic methods of determining the amount of air being inducted into an internal combustion engine. One is direct measurement via the use of an air flow meter disposed in the induction system and the other is indirect measurement or estimation based on parameters such as the engine speed and induction vacuum. The first method suffers from the drawback that air flow meters are inevitably expensive and delicate instruments prone to malfunction while the second method usually requires at least two sensors (vaccum and engine speed) and circuitry to perform a calculation based on the inputs of the sensors. A simpler and more popular method of estimating the air flow is to use, in place of the induction vaccuum and engine speed, the throttle valve opening degree. This particular techanique while being relatively simple, has suffered from one notable drawback. Since the throttle valve is inevitably disposed in an induction passage which takes the form of a right cylinder, a slight opening movement of the throttle valve blade suddenly raises the air flow from a very low value to a substantial one despite the slight increment in opening degree. Accordingly at low throttle settings the change in air flow past the throttle valve is very large as compared with the relatively small change in output of a sensor connected to the throttle valve. This has necessitated complex circuitry to compensate for this phenonenon and/or leads to erroneous control of fuel injection systems at these low throttle opening degrees of course in turn leading to poor air-fuel ratio control.

A typical example of the latter mentioned arrangement is illustrated in FIGS. 1 to 3 of the attached drawings.

In these figures the numeral 10 denotes part of the induction passage having a right cylinder configuration. A throttle valve blade 12 is rotatably disposed in the induction passage on a shaft 14. A suitable control linkage 16 operatively interconnects the shaft with the accelerator pedal or the like (not shown). A sensor in the form of a variable resistor 18 is, as shown, operatively connected to the shaft 14 for outputting an electrical signal which varies in dependence on the position of a movable contact on the stationary contact 22.

However, the output of this type of variable resistor has been found to not to be able to accurately indicate the actual air flow until the throttle valve has opened a substantial degree.

SUMMARY OF THE INVENTION

The present invention features either a specially configured induction passage or throttle valve blade which at least for the initial opening (say 0 to 40 degrees) of the throttle valve restricts the air flow past the edge of the throttle valve blade to eliminate any sudden variation in air flow normally experienced during the initial opening of the throttle valve and to increase the amount of rotation of the throttle valve necessary for a given increase in air flow when the throttle valve is opened from its closed position whereby the output of a simple variable resistor connected to the shaft on which the throttle valve is mounted, can be used to accurately indicate the amount of air flowing past the edge of the throttle valve even at low throttle valve settings.

BRIEF DESCRIPTION OF THE DRAWINGS

The features and advantages of the arrangement of the present invention will become more clearly appreciated from the following description taken in conjunction with the accompanying drawings in which like reference numerals denote corresponding elements, and in which.

DETAILED DESCRIPTION OF THE PREFERRED EMBODIMENTS

Figure 4:
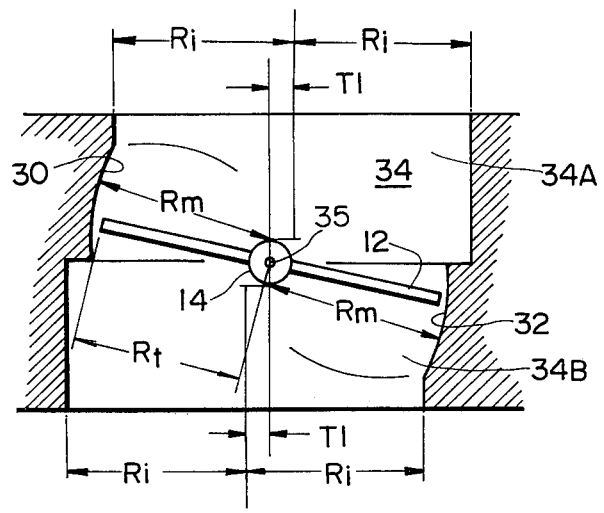
FIG. 4 is a sectional view of a first embodiment of the present invention.
Figure 5:
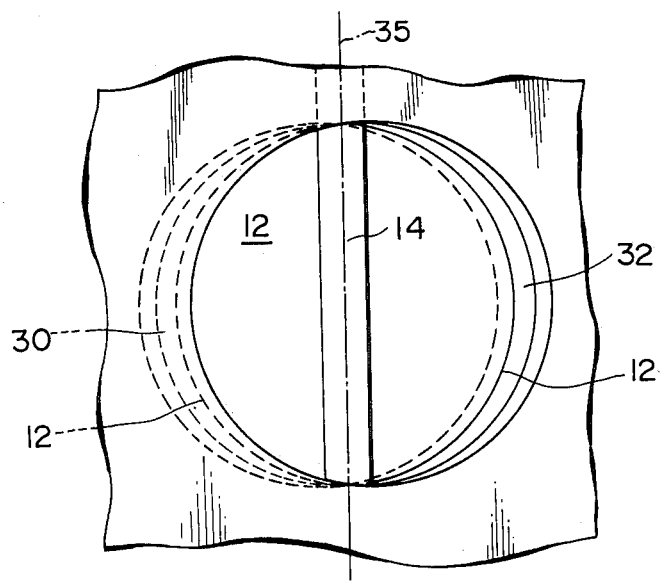
FIG. 5 is a plan view showing the various diameter relationships of the arrangement of FIG. 4.

Turning now to the drawings and more specifically to FIGS. 4 and 5, a first embodiment of the invention is shown.

In this embodiment a pair of metering walls 30, 32 are provided in the induction passage 34 for controlling the flow of air past the edge of the throttle valve blade 12. In this embodiment the metering walls take the form of curved crescent shaped surfaces having radii of curvature Rm, Rm. Each of these radii are greater than the radius of the throttle valve Rt and have origins offset from the axis 35 of the throttle valve by distances T1, T1 along the longitudinal axis of the induction passage which in turn is offset from the respective center axes of the staggered upstream and downstream portions 34A and 34B of the induction passage 34 by said distance T1.

The radii Ri, Ri of the portions of the induction passage upstream and downstream of the throttle valve and metering walls are arranged to be slightly larger than that of the throttle valve (Viz.Rt) so as to allow for a clearance between the edge of the throttle valve blade and the induction passage. This in part compensates for the inherent flow restriction provided by the metering walls and allows for the passage of sufficient air for the idling of the engine (viz., when the throttle valve is closed).

Now, with the just described arrangement as the throttle valve opens it wil be appreciated that the clearance between the edge of the throttle valve blade and the metering walls gradually increases until the termination of the metering walls. In this embodiment the metering walls are arranged to extend to a level which approximates the first 40 degrees of rotation of the throttle valve. The reason for this being that the amount of engine intake air is determined in accordance with the pressure differential across the throttle valve and the opening degree thereof (viz. the effective cross sectional area available for the passage of air). However, as the pressure prevailing upstream of the throttle valve is approximately equal to atmosphere pressure, the velocity of the air which passes by the throttle valve becomes constant at the sonic value when the induction vacuum reaches or exceeds approximately $-350$ mmHg. Hence at light load operation when the throttle valve is opened only slightly the variation in the amount of air inducted varies soley in accordance with the opening degree of the throttle valve. However after the throttle valve has been opened by approximately 40 degrees this phenonenon ceases to occur. Thus the metering walls are no longer of great effect as the pressure differential at this time is insufficient to induce the aforementioned sonic flow and the amount of air inducted is determined in accordance with both of the effective area and the pressure differential. Hence with the just described metering wall arrangement the theoretically desired results are for all intents and purposes achieved.

Figure 1:
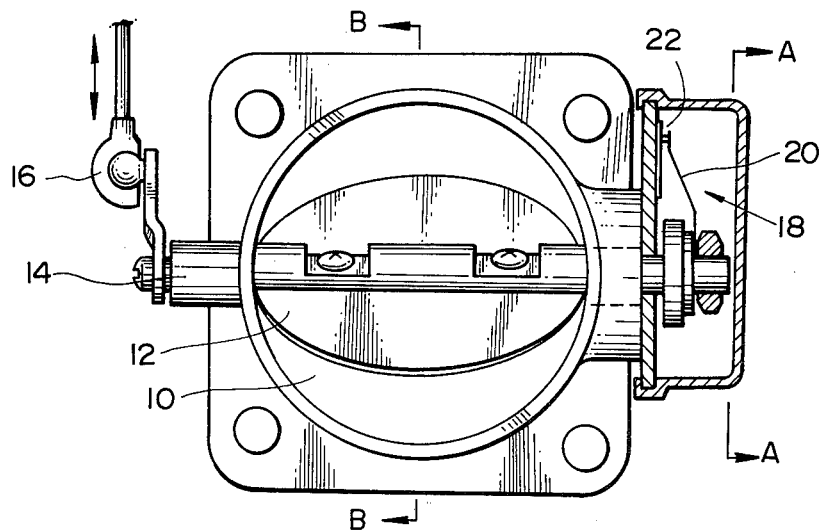
FIG. 1 is a plan view of the prior art arrangement briefly discussed under the heating of "Description of the Prior Art"
Figure 2:
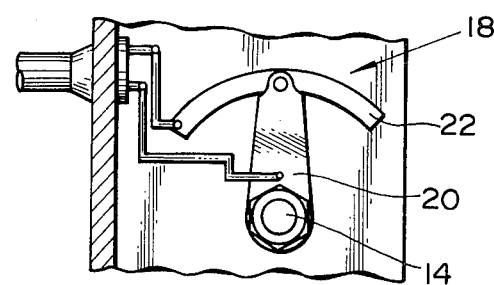
FIG. 2 is a sectional view taken along the section line A—A of FIG. 1 which shows in detail the variable resistor utilized in the prior art.
Figure 3:
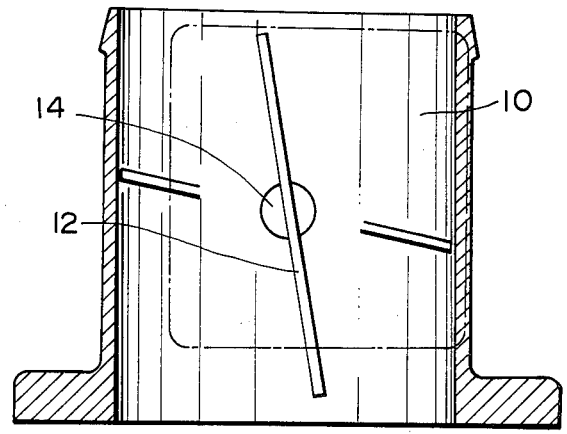
FIG. 3 is sectional view taken along section line B—B of FIG. 1.
Figure 6:
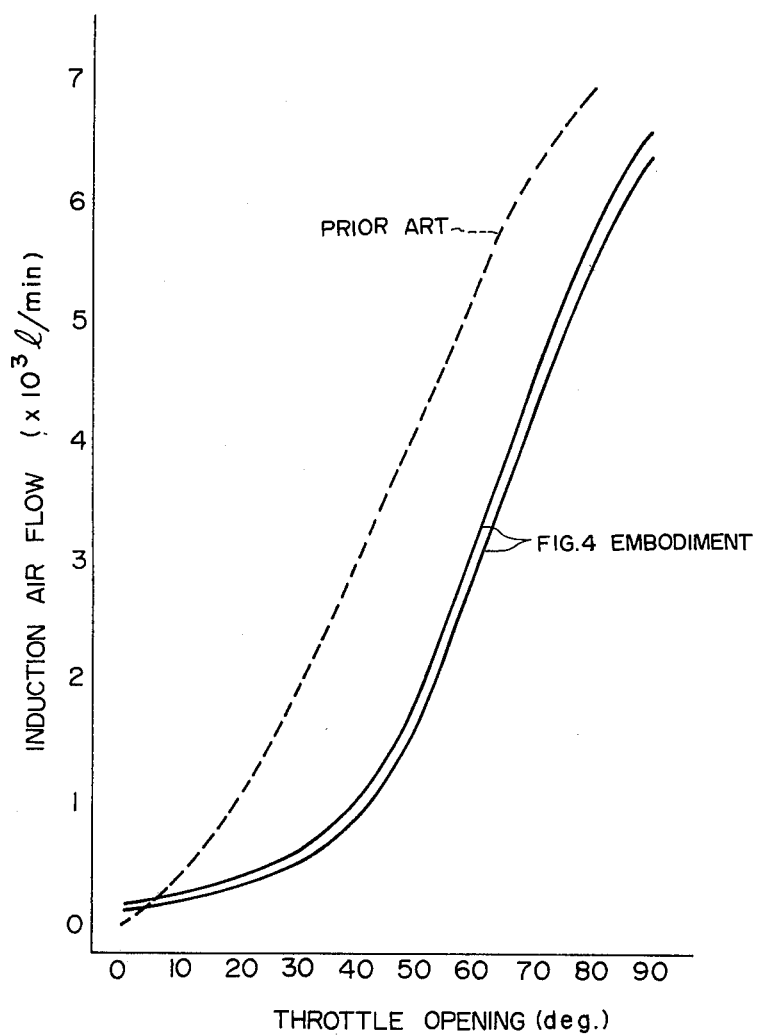
FIG. 6 is a graph comparing the air flow characteristics of the prior art arrangement utilizing a right cylinder induction passage and that provided by the arrangement illustrated in FIG. 4, in terms of induction air flow and throttle opening degree.

FIG. 6 graphically shows the results obtained with the arrangement of FIG. 4 and compares same with the flow characteristics of an arrangement typified by that shown in FIGS 1 to 3. In this graph the broken line plot indicates the prior art flow control characteristics while the solid line plots indicate those provided by the invention. As will be appreciated the amount of air permitted to pass by the throttle valve in the arrangement of the invention is notably less than in the case of the prior art. However, after the throttle valve is opened by about 40 degrees the prior art plot and that of the invention become approximately parallel.

The flow restriction at low throttle settings allows the movable contact of a variable resistor (such as shown in FIG. 2) to move through a much greater distance for a given change of air flow as compared with the conventional arrangements thus permitting a usable variation in output of the variable resistor for a given flow change. Moreover, during normal use of an automotive vehicle the throttle valve is frequently located within the 0 to 40 degree range through which the metering walls of the first embodiment extend and in which the output of the variable resistor provides a good indication of the air flow. Thus within this range good control of the air-fuel ratio, for example can be obtained.

However, in the case that the diameter of the throttle valve used in the invention is the same as that in the prior art, it will be appreciated that overall the amount of air admitted to the engine is reduced by the initial flow restriction whereby it is preferable to arrange the throttle valve blade of the invention to open to a full 90 degrees as compared with the usual 80 degrees of conventional arrangements.

Figure 7:
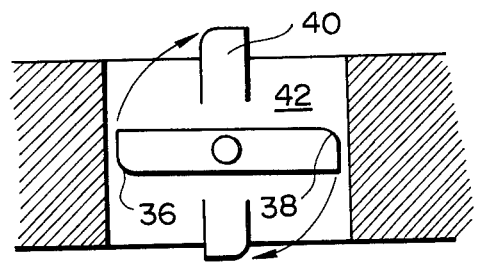
FIG. 7 shows a second embodiment of the present invention.

FIG. 7 shows a second embodiment of the present invention. In those embodiment a pair of metering walls 36, 38 are formed on relatively thick throttle valve 40. The induction passage 42 in this case takes the form of a right cylinder. This arrangement is meritorious in that production of the throttle valve and induction passage are rendered relatively simple and in that the throttle valve may be readily interchanged with another having a different set of metering walls when and if desired. The thickness of the throttle valve which would otherwise tend to limit the amount of air inductable may be compensated for by increasing the diameter of both the induction passage 42 and the throttle valve 40.

Figure 8:
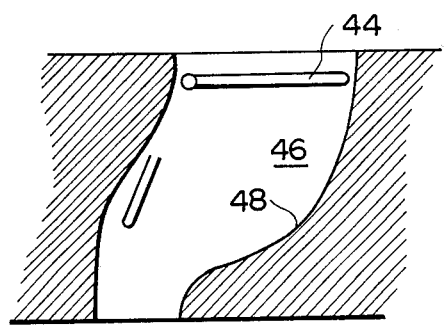
FIG. 8 shows a third embodiment of the present invention.

FIG. 8 shows a third embodiment of the present invention. In this embodiment the normal butterfly type throttle valve is replaced with a flap type 44 which is disposed in a specially configured induction passage 46. With this arrangement is possible to provide a single metering wall 48, which extends substantially through the whole pivotal range of the flap 44 which, as shown can pivot through an angle of greater than 90 degrees. This accordingly increases the length of the stationary contact of a variable resistor associated therewith and thus magnifies the accuracy of the air flow detection.

Figure 9:
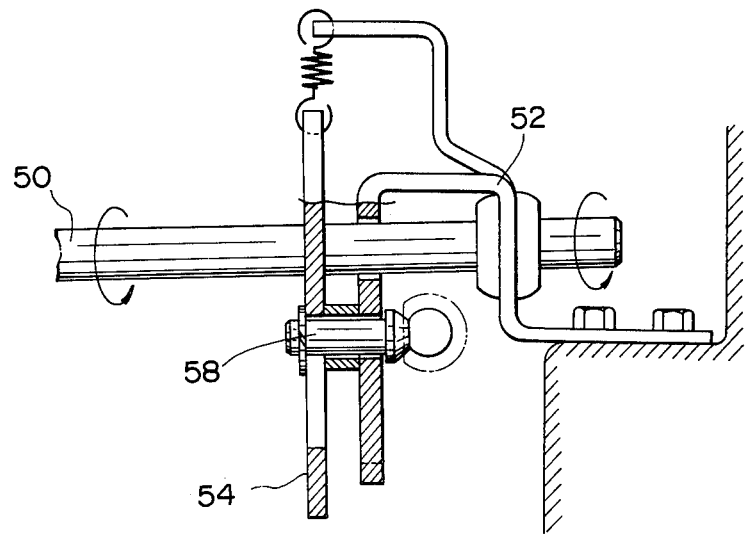
FIGS. 9 and 10 illustrate a suitable device for compensating for the relatively large amount of accelerator pedal travel required for a relatively small change in the induction air volume which occur at low throttle settings with the arrangements of FIGS. 4 and 7 and FIG. 11 is a graph showing, in terms of lever ratio and accelerator pedal depression, the control characteristics provided by the device FIGS. 9 and 10.
Figure 10:
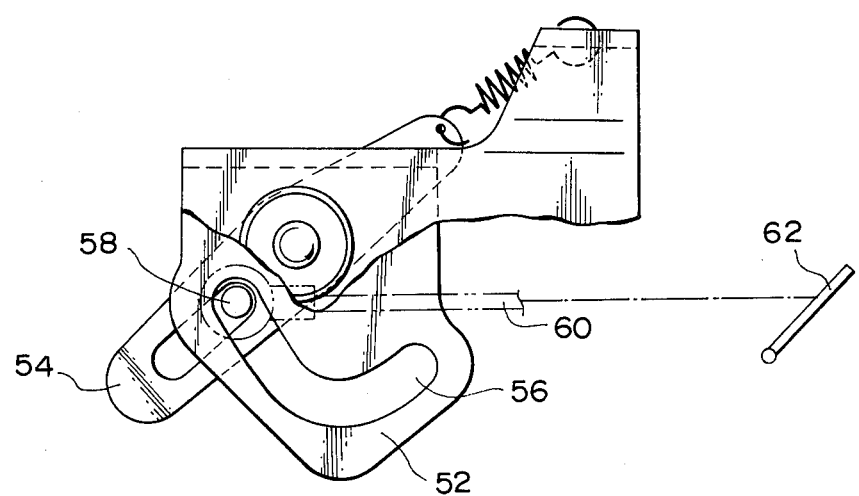

FIGS. 9 and 10 illustrate a device suitable for compensating for the increased accelerator pedal travel required to achieve a geiven air flow to the cylinders of the engine, especially at low throttle settings, with the arrangement of FIGS. 4 and 5.

Figure 11:
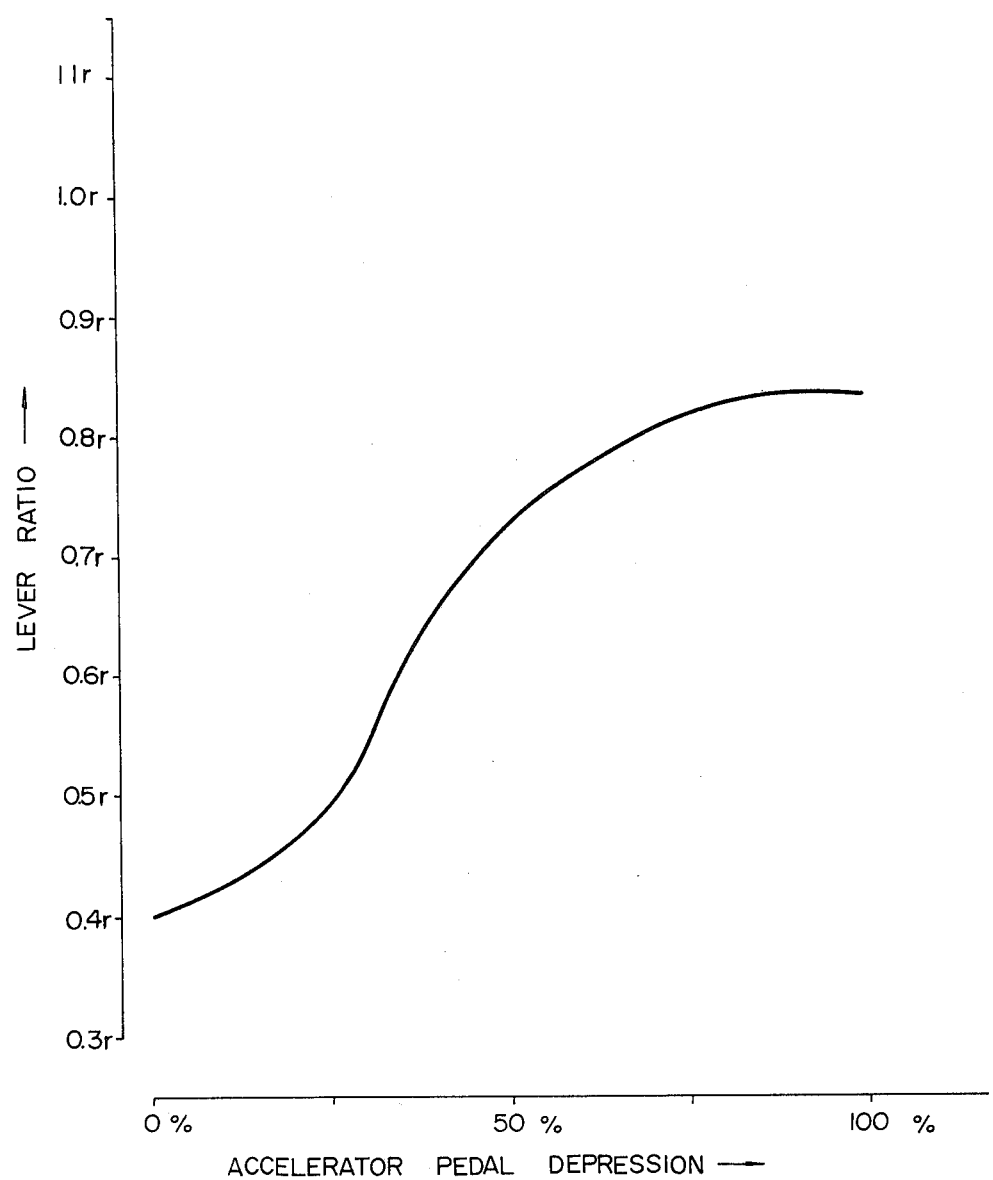

FIG. 11 is a graph showing the operational characteristics of the device shown in FIGS. 9 and 10. As will be appreciated the rate at which the throttle valve is rotated is relatively high during initial accelerator depressions while after the accelerator pedal (or the like) is depressed or moved through about half of its throw, the rate at which the trottle valve is rotated reduces. With this arrangement the driver depressing the accelerator pedal will obtain the same engine response as with a conventional arrangement but with a simultaneous accurate detection of the induction air flow.

Referring back to FIGS. 9 and 10, a shaft 50 is connected with or serves to mount the throttle valve blade of the invention. A stationary bracket 52 serves to rotatably support the shaft 50 which carries thereon a slotted member 54. The stationary bracket is also provided with a slot 56. A slide pin 58 is slidably disposed in both the grooves 56 and that are formed in the stationary bracket 52. A cable 60 interconnects the pin 58 with an accelerator pedal 62. Thus upon depression of the accelerator pedal the curvature of the grooves in which the pin 58 slides induces rotation rates of the shaft 50 which correspond to the curve shown in FIG. 11.

Thus in summary, the present invention features a throttle valve having or cooperating with a metering wall or walls which act to limit the air flow past the edge of the throttle valve when it is initially moved from its closed position thus increasing the amount of rotation necessary for a given change in air flow. This increases the amount of rotation in which the reduced change of air flow can be detected and accordingly allows an increased change in output of a variable resistor operatively connected with the throttle valve, facilitating detection of the air flow at frequently used relatively low throttle settings.

What is claimed is:

1. In an internal combustion engine, having a cylinder and an induction passage leading from the ambient atmosphere to said cylinder, an air flow sensor comprising:
   a manually controlled butterfly valve operatively disposed in said induction passage and rotatable for controlling the amount of air inducted through said induction passage;
   a position sensor operatively connected to said butterfly valve for sensing the angular position thereof and producing an output signal indicative of said sensed position; and
   means defining a curved wall on one of said butterfly valves and said induction passage for restricting the air flow past said butterfly valve as it opens from a closed position and for causing said air flow to be essentially proportional to the opening degree of said butterfly valve whereby said signal outputted by said sensor accurately indicates said air flow.

2. An air flow sensor as claimed in claim 1, wherein said means takes the form of a pair of metering walls which juxtapose the edge of said butterfly valve.

3. An air flow sensor as claimed in claim 2, wherein each of said metering walls has a center of curvature offset from the axis about which said throttle valve rotates and a radius of curvature greater than the radius of said throttle valve, said throttle valve being disposed with respect to each said metering wall so that when said throttle valve assumes the minimum opening position thereof the minimum clearance is defined between the edge of said throttle valve and each said metering wall and so that as the throttle valve is rotated from its minimum opening position the clearance between the edge of said throttle valve and each metering wall continuously increases.

4. An air flow sensor as claimed in claim 1, wherein said means takes the form of metering walls formed on said throttle valve and said induction passage, wherein said butterfly valve is disposed, takes the form of a right cylinder.

5. An air flow sensor as claimed in claim 2 or 4, wherein said metering walls extend to cooperate with said butterfly valve at least until the pressure differential across said throttle valve ceases to induce sonic air flow past the edge of said throttle valve.

6. An air flow sensor as claimed in claim 2 or 4, wherein said throttle valve is constructed to be openable to permit the maximum possible air flow therepast to compensate for the initial flow restriction by said metering walls.

7. An air flow sensor as claimed in claim 2 or 4, further comprising an accelerator pedal and a linkage means operatively interconnecting said butterfly valve and said accelerator pedal, said linkage means initially rapidly rotating said throttle valve per unit depression of said accelerator pedal and thereafter reducing the rate of rotation per unit depression of said accelerator pedal after the throttle valve has rotated from its closed position by a predetermined degree.

8. For use in an internal combustion engine having at least one cylinder, an induction passage leading from ambient atmosphere to said cylinder, and a butterfly valve rotatably mounted in said induction passage for controlling the amount of air passing through said induction passage, a combination for sensing air flow through said induction passage, comprising:
   manually operable means operatively connected with said butterfly valve for controlling the movement thereof;
   a position sensor operatively connected to said butterfly valve for sensing the angular position of said butterfly valve and producing an output signal indicative of said sensed position, said output signal changing by a predetermined amount in accordance with each predetermined change in said angular position; and
   means defining a curved wall on one of said throttle valves and said induction passage for restricting the air flow past said butterfly valve and for causing said air flow to be essentially proportional to the opening degree of said butterfly valve whereby a predetermined change in air flow in said induction passage is accurately indicated by each predetermined change in said output signal; and
   wherein air flow through said induction passage varies in velocity between sonic and subsonic speeds based on the angular position of said buterfly valve, and wherein said means is effective for restricting said air flow during said sonic speeds.

9. In an internal combustion engine, having a cylinder and an induction passage leading from the ambient atmosphere to said cylinder, an air flow sensor comprising:
   a butterfly valve operatively disposed in said induction passage and rotatable for controlling the air inducted through said induction passage;
   a position sensor operatively connected to said butterfly valve for sensing the angular position thereof and producing an output signal indicative of said sensed position; and
   means in the form of a pair of metering walls which juxtapose the edge of said butterfly valve for restricting the air flow past said butterfly valve as it opens from a closed position and for causing said air flow to be essentially proportional to the opening degree of said butterfly valve whereby said signal outputted by said sensor accurately indicates said air flow, wherein each of said metering walls has a center of curvature offset from the axis about which said throttle valve rotates and a radius of curvature greater than the radius of said throttle valve, said throttle valve being disposed with respect to each said metering wall so that when said throttle valve assumes the minimum opening position thereof, the minimum clearance is defined between the edge of said throttle valve and each said metering wall and so that as the throttle valve is rotated from its minimum opening position the clearance between the edge of said throttle valve and each metering wall increases.

* * * * *